United States Patent Office 3,441,599
Patented Apr. 29, 1969

3,441,599
PROCESS FOR PREPARING HYDROXYALKYLAC-RYLATE OR HYDROXYALKYLMETHACRYLATE
Masayuki Murayama, Niigata-shi, Japan, assignor to Japan Gas-Chemical Company, Inc., Tokyo, Japan, a corporation of Japan
No Drawing. Filed May 9, 1966, Ser. No. 548,397
Int. Cl. C07c 69/52, 65/54
U.S. Cl. 260—486      4 Claims

ABSTRACT OF THE DISCLOSURE

A process for preparing a hydroxyalkylacrylate or a hydroxyalkylmethacrylate by a very rapid reaction which comprises reacting an alkylene oxide with acrylic or methacrylic acid employing a catalyst system consisting of an iron (III) compound as a catalyst and one or more of mercury, chromium and iodine as promoters.

---

The present invention relates to a commercially advantageous process for preparing a hydroxyalkylacrylate or a hydroxyalkylmethacrylate as well as a commercially advantageous process for purifying the same.

Alkaline catalysts are effective in the synthesis of a hydroxyalkylacrylate or a hydroxyalkylmethacrylate by the reaction of an alkylene oxide with acrylic or methacrylic acid. As such catalysts pyridine (U.S. Patent No. 2,484,-487), sodium methacrylate (U.S. Patent No. 3,038,886) and the like have been heretofore known.

All of these previously known processes have not been commercially advantageous since their reaction time is as long as 24 hours to 48 hours and yield is as low as about 50 percent.

United States Patent No. 3,059,024 discloses employing a tetraalkyl ammonium salt as a catalyst, and the use of this catalyst not only reduced the reaction time to about 7 hours but also increased the yield to over 90 percent.

An object of the present invention is to provide a commercially advantageous process for preparing a hydroxyalkylacrylate or a hydroxyalkylmethacrylate.

Another object of the invention is to provide a commercially advantageous process for purifying a hydroxyalkylacrylate or a hydroxyalkylmethacrylate.

Another object of the invention is to provide a process for preparing a hydroxyalkylacrylate or a hydroxyalkylmethacrylate wherein hydroquinone can be employed as a free radical polymerization inhibitor without coloring the product.

According to the present invention, there is provided a process for preparing a hydroxyalkylacrylate or a hydroxyalkylmethacrylate at a good yield and in a high purity which comprises reacting an alkylene oxide with acrylic or methacrylic acid for a short time, characterized by employing a catalyst system consisting of an iron (III) compound as a catalyst and one or more of copper, a copper compound, mercury, a mercury compound, chromium, a chromium compound, iodine and a mutual compound of these elements as promoters.

This process according to the present invention has an advantage that it eliminates the necessity to carry out the reaction under pressure since the reaction velocity is very high. If the catalyst is dissolved in acrylic or methacrylic acid and the resultant solution is maintained at 50° C. to 120° C. with stirring and the alkylene oxide in a form of liquid or gas is then blown into the solution, the reaction will immediately proceed. The construction cost for the reaction apparatus is therefore reduced and this process is very advantageous commercially.

This process has another advantage in that the reaction velocity is directly proportional to both the concentration of the alkylene oxide and the concentration of the catalyst and has no relation to the concentration of acrylic or methacrylic acid. Therefore, even if the concentration of acrylic or methacrylic acid becomes lower at the last stage of the reaction, the reaction velocity will not be reduced and the unreacted acrylic or methacrylic acid will be substantially exhausted in a short time provided that the alkylene oxide is continuously introduced into the reaction system. The load on the purification stage is therefore decreased and it also makes this process commercially very advantageous.

During the reaction a small amount of conventional free radical polymerization inhibitor may be added such as tannic acid, N,N'-di-2-naphthyl-p-phenylene-diamine, etc.

When hydroquinone is employed as the free radical polymerization inhibitor, hydroquinone is oxidized with the iron (III) compound into quinone and it is difficult to completely remove this quinone by an purification process. Therefore, yellowish products may be always obtained. Thus it is unsuitable to use hydroquinone as the free radical polymerization inhibitor. However, considered from the polymerization inhibition effect, hydroquinone is the best inhibitor. Two to tens of times the amount of hydroquinone should be always employed in order to obtain the same effect with the other free radical polymerization inhibitor as that obtained with hydroquinone.

A hydroxyalkylacrylate or a hydroxyalkylmethacrylate is usually copolymerized with another vinyl monomer in an organic solvent and the resultant copolymer is used as a material for thermo-setting acrylic coatings. If said acrylic coating material is synthesized employing the hydroxyalkylacrylate or hydroxyalkylmethacrylate obtained with an iron (III) compound as a catalyst and copper, a copper compound, mercury, a mercury compound, chromium, a chromium compound, iodine, etc. as promoters, a slight turbidity may be often produced. This turbidity becomes intense if the product obtained by heating with the catalyst for a long time is employed for the polymerization.

It is therefore required to take care of the structure of a distillation column and the operation method therefor and to reduce the contact time with the catalyst if this synthesis liquid is to be purified. We have now found that the product is not colored even if hydroquinone is employed as a free radical polymerization inhibitor, provided that an iron (III) compound is employed as a catalyst and a chromium compound as a promoter and as an additive an alkali metal compound, an alkaline earth metal compound, ammonia, an ammonia compound, an amine, a pyridine and the like.

On further research, we have found a new effective process of purification.

It is necessary that there are present an iron (III) compound, a chromium compound and an additive in such a catalyst system as hydroquinone may be used as a free radical polymerization inhibitor in the synthesis of a hydroxyalkylacrylate or hydroxyalkylmethacrylate from an alkylene oxide and acrylic or methacrylic acid. Even if any one of these components is absent, quinone will be produced by the oxidation of hydroquinone.

On the other hand, whichever free radical polymerization inhibitor may be employed, polymerization loss is hardly found in the synthesis stage but most of the polymerization loss appears in the purification stage. From this standpoint we have succeeded in the preparation of highly pure and highly color-free hydroxyalkylacrylates and hydroxyalkylmethacrylates by employing a free radical polymerization inhibitor other than hydroquinone in the synthesis stage and employing hydroquinone in the purification stage.

According to another aspect of the present invention, there is provided a commercially advantageous process for purifying a hydroxyalkylacrylate or hydroxyalkylmethacrylate which comprises distilling a crude hydroxyalkylacrylate or hydroxyalkylmethacrylate together with hydroquinone and one or more of an alkaline material selected from the group consisting of an alkali metal compound, an alkaline earth metal compound, ammonia, an ammonia compound, an amine, a pyridine and the like, said crude hydroxyalkylacrylate or hydroxyalkylmethacrylate being synthesized by reacting an alkylene oxide with acrylic or methacrylic acid in the presence of an iron (III) compound as a catalyst, a chromium compound as a promoter and a free radical polymerization inhibitor other than hydroquinone.

This aspect of the present invention is characterized in that the polymerization inhibition effect is very great and there is no polymerization loss since hydroquinone can be used as a free radical polymerization inhibitor in the purification stage. This is a commercially advantageous process of purification since hydroquinone is a cheap free radical polymerization inhibitor.

This aspect of the present invention is further characterized in that a highly color-free product can be obtained because an alkaline material added together with hydroquinone in the purification stage prevents the oxidation of hydroquinone by an iron (III) compound as a catalyst as well as a chromium compound added as a promoter in the synthesis stage.

This aspect of the present invention is still further characterized in that no turbidity is seen when acrylic coating materials are prepared from a hydroxyalkylacrylate or hydroxyalylmethacrylate purified by adding an alkaline material, even if the acrylate or methacrylate is that obtained by heating the reaction mixture with a catalyst for a long time.

This aspect of the present invention is still further characterized in that we can eliminate the use of an alkaline material having a negative effect on the reaction velocity in the synthesis stage. If an alkaline material is not present, there is linear relationship between the reaction velocity and the concentration of ethylene oxide as well as the concentration of a catalyst, but the reaction velocity has no relation to the concentration of acrylic or methacrylic acid. On the other hand, if an alkaline compound is present, there is also a linear relationship between the reaction velocity and the concentration of acrylic or methacrylic acid, and thereby the amount of unreacted acrylic or methacrylic acid will increase at the last stage of the reaction. However, in the process according to the present invention, it is possible to purify a synthesis liquid substantially free from unreacted acid since an alkaline material is absent during the synthesis stage.

According to another aspect of the present invention there is provided a process for preparing a highly pure hydroxyalkylacrylate or hydroxyalkylmethacrylate at a good yield and in a short time which comprises reacting an alkylene oxide with acrylic or methacrylic acid characterized by carrying out the reaction in the presence of an iron (III) compound as a catalyst, a chromium compound as a promoter, one or more additives such as an alkali metal compound, an alkaline earth metal compound, ammonia, an ammonia compound, an amine, a pyridine, etc. and a mutual compound thereof.

If water is present during the synthesis stage, quinone tends to be formed by the oxidation of hydroquinone. It is therefore necessary to increase the amount of the first promoter. Although the presence of an alkaline material in the reaction liquid has a negative effect on the reaction velocity, such an amount as employed in the present invention can be neglected. When a catalyst is added to acrylic or methacrylic acid together with a promoter and an additive both in 0.02 to 2 times the amount of the catalyst and the resultant mixture is maintained at 50 to 120° C. with stirring and an alkylene oxide in the form of liquid or gas is then blown into the mixture at a normal pressure, the reaction immediately proceeds.

An advantage of this aspect of the present invention is that hydroquinone can be employed as a free radical polymerization inhibitor. If the catalysts of the present invention are employed, the formation of quinone by the oxidation of hydroquinone is not found and the product is never colored at the purification stage. A sufficient polymerization inhibition effect is obtained by using one half or one several decadeth the amount of the other free radical polymerization inhibitor. This process is very advantageous as a commercial process of manufacture, since the polymerization loss can be prevented by the use of a small amount of cheap hydroquinone.

Another advantage of this aspect of the present invention resides in that a polymer having good appearance can be obtained by the polymerization of the product. Thus there is no formation of turbidity at all in the polymeric product when an acrylic coating material is prepared from the hydroxyalkylacrylate or hydroxyalkylmethacrylate obtained by employing the catalyst system of the present invention. As this is also true even if the starting material is that obtained by heating the reaction mixture with a catalyst for a long time, a high quality product can be obtained without taking care of the purification stage. In order to further illustrate this result in detail, there is shown in Table I comparative examples wherein the other catalyst systems and the other free radical polymerization inhibitors were employed under the same condition as in Example X. The reaction yield was about 95 percent and there was hardly found the polymerization loss in each example except Comparative Example II wherein chromic anhydride was not contained so that the reaction yield was as low as 89 percent. When hydroquinone was employed, the distillation yield was not lower than 90 percent and the polymerization of the distillation residue was not found. On the other hand, when tannic acid was employed, the distillation residue was polymerized as about 60 percent was distilled off. The purity of the product was about 99 percent by weight in each example except Comparative Example II wherein chromic anhydride was not contained and the amount of unreacted acrylic acid was large and thereby the purity of the product was low. When tannic acid was employed, the color of the product was excellent. On the other hand, when hydroquinone was employed, only Example X, wherein ferric chloride, chromic anhydride and sodium carbonate were contained, yielded a product having an excellent color and the color of the product was over 100 APHA in case that sodium carbonate was absent and 30 APHA in case that chromic anhydride was absent. When sodium carbonate was present, a polymer having excellent appearance was obtained. On the other hand, when sodium carbonate was absent, turbidity was formed in the resultant polymer.

As seen from the above-mentioned results, only Example X employing a combination of the catalyst system of the present invention and hydroquinone gave satisfactory results in all of the reaction yield, the distillation yield, the purity of the product, the color of the product and the appearance of the polymer.

Also, when the catalyst system of the present invention was employed, a product having color up to 5 APHA was obtained even if as much as one percent by weight of hydroquinone was added.

Alkylene oxides may be those containing two to four carbon atoms such as ethylene oxide, propylene oxide and the like. The reaction is completed by blowing 1.1 to 1.7 mols of the alkylene oxide into one mol of acrylic or methacrylic acid for 0.5 to 3 hours.

The iron (III) compound may be a halide, a thiocyanate, a nitrate, a carbonate, a sulfate, an organic acid

TABLE I

| | Ex. X | Comparative Ex. I | Comparative Ex. II | Comparative Ex. III | Comparative Ex. IV |
|---|---|---|---|---|---|
| Catalyst | Ferric chloride | Ferric chloride | Ferric chloride | Ferric chloride | Ferric chloride |
| Promoter | Chromic anhydride | Chromic anhydride | | Chromic anhydride | Chromic anhydride |
| Additive | Sodium carbonate | | Sodium carbonate | Sodium carbonate | |
| Polymerization inhibitor | Hydroquinone | Hydroquinone | Hydroquinone | Tannic acid | Tannic acid |
| Yield of Reaction | 94 | 96 | 89 | 94 | 95 |
| Yield of Distillation | 93 | 93 | 92 | 65 | 61 |
| Purity of Product | 99 | 99 | 97 | 99 | 99 |
| Color of Product (APHA) | 0 | Over 100 | 30 | 0 | 2 |
| Appearance of Polymer | 0 | X | 0 | Y | X |

Units: Catalyst — 4 grams; Promoter — 0.5 gram; Additive — 1 gram; Polymerization inhibitor — 0.5 gram; Yield of Reaction — Percent; Yield of Distillation — Percent; Purity of Product — Percent by weight; Color of Product — APHA.

salt and the like, and the amount of the iron compound added is 0.2 to 5 percent by weight of acrylic or methacrylic acid.

As copper and a copper compound, any of copper as the simple substance, monovalent copper salts and divalent copper salts may be employed such as monovalent and divalent copper oxides, halides, cyanates, sulfides, hydroxides, nitrates, carbonates, sulfates, organic acid salts and the like.

As mercury and a mercury compound, any of mercury as the simple substance, monovalent mercury salts and divalent mercury salts may be employed such as monovalent and divalent mercury oxides, halides, cyanates, sulfides, thiocyanates, nitrates, sulfates, organic acid salts and the like.

As chromium and a chromium compound, any of chromium as the simple substance, chromium (II) salts, chromium (III) salts and chromium (VI) salts may be employed such as chromium (II) or (III) oxides, halides, hydroxides, nitrates, sulfates, phosphates, organic acid salts and the like. The chromium (VI) salts include chromic anhydride, chromates, bichromates and the like.

Iodine may be employed as the simple substance. Iodides other than copper, mercury and chromium iodides have little effect as a promoter.

In the first aspect of the present invention, one or more promoters are added to a catalyst in 0.02 to 2 times the amount of the catalyst. The reaction may proceed in the presence of the catalyst alone, but the reaction velocity will increase by 2 to 5 times if the above-mentioned promoters are added to the catalyst. Some of those promoters are not completely soluble in acrylic or methacrylic acid in the reaction, but their effect as promoters are not impaired by this fact.

If an additive such as an alkali metal compound, an alkaline earth metal compound, an amine and a pyridine is mixed with the reaction mixture, the reaction velocity becomes proportional also to the concentration of acrylic or methacrylic acid. Therefore, when the concentration of acrylic or methacrylic acid is high, the reaction velocity is great. However, if the concentration of acrylic or methacrylic acid becomes low at the last stage of the reaction, the reaction velocity becomes very small, and a considerable amount of unreacted acrylic or methacrylic acid remains and it is impossible by any means to react the starting materials completely. It is therefore preferable to avoid the mixing of these alkaline materials with the reaction mixture.

As the alkali metal compound and the alkaline earth metal compound, an oxide, hydroxide, halide, cyanate, sulfide, thiocyanate, nitrite, nitrate, carbonate, bicarbonate, arsenate, phosphate, chromate, bichromate or the like of lithium, sodium, potassium, calcium, strontium, barium or the like may be employed.

As the ammonia compound a halide, thiocyanate, nitrite, nitrate, carbonate, phosphate, organic acid salt or the like of ammonia may be employed.

As the amine, any one of primary, secondary, tertiary and quarternary amines may be employed, and salts of these amines with inorganic and organic acids may be also used.

Pyridines may be employed either as such or salts thereof with inorganic or organic acids.

In the second aspect of the present invention, 0.05 to 5 percent by weight of the alkaline material is added to hydroxyalkylacrylate or hydroxyalkylmethacrylate. The amount of hydroquinone added enough to obtain a satisfactory effect is 0.05 to 0.5 percent by weight, but the product will not be colored even if a larger amount of hydroquinone is added.

The following examples illustrate the present invention.

Example I

Into a reactor 360 grams of acrylic acid, 0.2 gram of tannic acid, 4 grams of ferric chloride and 0.1 gram of copper powder were charged. The whole was heated to 80° C. after the reactor had been purged with nitrogen gas. The blowing of nitrogen was stopped and ethylene oxide in the form of gas was then blown at a rate of 150 grams per hour. The reaction was completed in two hours. Excess ethylene oxide leaving the reactor was cooled and recovered. The yield of hydroxyethylacrylate was 95 percent, and the amount of unreacted acrylic acid 0.2 percent by weight, and the amount of recovered ethylene oxide 70 grams.

Example II

Into a reactor 430 grams of methacrylic acid, 0.2 gram of N,N'-di-2-naphthyl-p-phenylenediamine, 6 grams of ferric sulfate and 0.4 gram of chromic anhydride were charged. The whole was heated to 70° C. after the reactor had been purged with nitrogen gas. Ethylene oxide in the form of liquid was blown at a rate of 200 grams per hour.

The reaction was completed in 1.5 hours. Excess ethylene oxide leaving the reactor was cooled and recovered. The yield of hydroxyethylmethacrylate was 94 percent, and the amount of unreacted methacrylic acid 0.3 percent by weight, and the amount of recovered ethylene oxide 65 grams.

Example III

Into a reactor 360 grams of acrylic acid, 0.1 gram of phenothiazine, 8 grams of ferric bromide and 1 gram of mercurous chloride were charged. The whole was heated to 90° C. after the reactor had been purged with nitrogen gas. Propylene oxide in the form of gas was then blown at a rate of 200 grams per hour. The reaction was completed in two hours. Excess propylene oxide leaving the reactor was cooled and recovered. The yield of hydroxypropylacrylate was 94 percent, and the amount of unreacted acrylic acid 0.2 percent by weight, and the amount of recovered propylene oxide 98 grams.

Example IV

Into a reactor 430 grams of methacrylic acid, 0.2 gram of N,N'-di-2-naphthyl-p-phenylenediamine, 8 grams of ferric nitrate and 2 grams of iodine were charged. The whole was heated to 70° C. after the reactor had been purged with nitrogen gas. Propylene oxide in the form of liquid was then blown at a rate of 200 grams per hour. The reaction was completed in two hours. Excess propylene oxide leaving the reactor was cooled and recovered. The yield of hydroxypropylmethacrylate was 96 percent, and the amount of unreacted methacrylic acid 0.2 percent by weight, and the amount of recovered propylene oxide 102 grams.

Example V

Into a reactor 360 grams of acrylic acid, 0.1 gram of tannic acid, 4 grams of ferric chloride and 0.5 gram of copper chromate were charged. The whole was heated to 85° C. after the reactor had been purged with nitrogen gas. Ethylene oxide in the form of gas was then blown at a rate of 200 grams per hour. The reaction was completed in 1.5 hours. Excess ethylene oxide leaving the reactor was cooled and recovered. The yield of hydroxyethylacrylate was 95 percent, and the amount of unreacted acrylic acid 0.3 percent by weight, and the amount of recovered ethylene oxide 68 grams.

Example VI 0.5 gram of sodium carbonate and 0.1 gram of hydroquinone were added to 300 grams of crude hydroxyethylacrylate (purity: 94 percent by weight) obtained by reacting ethylene oxide with acrylic acid at 80° C. and normal pressure in the presence of ferric chloride as a catalyst, chromic anhydride as a promoter and tannic acid as a free radical polymerization inhibitor. The resultant mixture was distilled and 260 grams of a fraction was obtained at 74 to 75° C. and 5 mm. Hg. This product had a purity of 99 percent by weight and a color of APHA 2 and showed no turbidity in the polymerization test.

Example VII 0.7 gram of tetramethylammonium chloride and 0.1 gram of hydroquinone were added to 300 grams of crude hydroxyethylmethacrylate (purity: 95 percent by weight) obtained by reacting ethylene oxide with methacrylic acid at 90° C. and normal pressure in the presence of iron naphthenate as a catalyst, chromic anhydride as a promoter and phenothiazine as a free radical polymerization inhibitor. The resultant mixture was distilled and 258 grams of a fraction was obtained at 84 to 86° C. and 5 mm. Hg. This product had a purity of 99 percent by weight and a color of APHA 0 and showed no turbidity in the polymerization test.

Example VIII 1 gram of ammonium chloride and 0.1 gram of hydroquinone were added to crude hydroxypropylacrylate (purity: 91 percent by weight) obtained by reacting propylene oxide with acrylic acid at 90° C. and normal pressure in the presence of basic iron acetate as a catalyst, sodium bichromate as a promoter and N,N'-di - 2 - naphthyl-p-phenylenediamine as a free radical polymerization inhibitor. The resultant mixture was distilled and 252 grams of a fraction was obtained at 72 to 73° C. and 5 mm. Hg. The product had a purity of 99 percent by weight and a color of APHA 3 and showed no turbidity in the polymerization test.

Example IX 2 grams of sodium methacrylate and 0.1 gram of hydroquinone were added to crude hydroxypropylmethacrylate (purity: 94 percent by weight) obtained by reacting propylene oxide with methacrylic acid at 70° C. and normal pressure in the presence of ferric bromide as a catalyst, ammonium chromate as a promoter and pyrogallol as a free radical polymerization inhibitor. The resultant mixture was distilled and 257 grams of a fraction was obtained at 82 to 83° C. and 5 mm. Hg. The product had a purity of 99 percent by weight and a color of APHA 0 and showed no turbidity in the polymerization test.

Example X

Into a reactor 360 grams of acrylic acid, 0.05 gram of hydroquinone, 4 grams of ferric chloride, 0.5 gram of chromic anhydride and 1 gram of sodium carbonate were charged. The whole was heated to 80° C. after the reactor had been purged with nitrogen gas. Ethylene oxide in the form of gas was then blown at a rate of 150 grams per hour. The reaction was completed in two hours. Excess ethylene oxide leaving the reactor was cooled and recovered. The yield of hydroxyethylacrylate was 94 percent, and the amount of unreacted acrylic acid 0.2 percent by weight. This resultant mixture was subjected to simple distillation to obtain 500 grams of hydroxyethylacrylate having a purity of 99 percent by weight. This product had a color of APHA 0 and showed no turbidity in the polymerization test.

Example XI

Into a reactor 430 grams of methacrylic acid, 0.05 gram of hydroquinone, 6 grams of ferric thiocyanate, 1 gram of chromium chloride and 1 gram of tetramethylammonium chloride were charged. The whole was heated to 90° C. after the reactor had been purged with nitrogen gas. Ethylene oxide in the form of liquid was then blown at a rate of 200 grams per hour. The reaction was completed in 1.5 hours. Excess ethylene oxide leaving the reactor was cooled and recovered. The yield of hydroxyethylmethacrylate was 95 percent, and the amount of unreacted methacrylic acid was 0.1 percent by weight.

This resultant mixture was subjected to simple distillation to obtain 570 grams of hydroxyethylmethacrylate having a purity of 99 percent by weight. This product had a color of APHA 5 and showed no turbidity in the polymerization test.

Example XII

Into a reactor 360 grams of acrylic acid, 0.05 gram of hydroquinone, 10 grams of ferric sulfate, 0.5 gram of ammonium chromate and 0.5 gram of ammonium chloride were charged. The whole was heated to 80° C. after the reactor had been purged with nitrogen gas. Propylene oxide in the form of gas was then blown at a rate of 200 grams per hour. The reaction was completed in two hours. Excess propylene oxide leaving the reactor was cooled and recovered. The yield of hydroxypropylacrylate was 95 percent, and the amount of unreacted acrylic acid was 0.1 percent by weight. This resultant mixture was subjected to simple distillation to obtain 560 grams of hydroxypropylacrylate having a purity of 99 percent by weight. This product had a color of APHA 2 and showed no turbidity in the polymerization test.

Example XIII

Into a reactor 430 grams of methacrylic acid, 0.05 gram of hydroquinone, 8 grams of basic ferric acetate, 0.5 gram of chromic anhydride and 2.5 grams of potassium iodide were charged. The whole was heated to 80° C. after the reactor had been purged with nitrogen gas. Propylene oxide in the form of liquid was then blown at a rate of 200 grams per hour. The reaction was completed in two hours. Excess propylene oxide leaving the reactor was cooled and recovered. The yield of hydroxypropylmethacrylate was 96 percent and the amount of unreacted methacrylic acid was 0.1 percent by weight. This resultant mixture was subjected to simple distillation to obtain 630 grams of hydroxypropylmethacrylate having a purity of 99 percent by weight. This product had a color of APHA 2 and showed no turbidity in the polymerization test.

What I claim is:
1. A process for preparing a compound selected from the group consisting of hydroxyalkylacrylates and hydroxyalkylmethacrylates which comprises reacting at a temperature of about 50° to about 120° C., an acid selected from the group consisting of acrylic acid and methacrylic acid and about 1.1 to about 1.7 moles of an alkylene oxide having 2 to 4 carbon atoms per mole of said acid in the presence of (a) 0.2 to 5 percent by weight of said acid of an iron (III) catalyst selected from the group consisting of iron halides, ferric nitrate, ferric thiocyanate, ferric carbonate, ferric sulfate and organic acid salts of iron and (b) a promoter selected from the group consisting of A, B and C wherein A is a combination of 0.02 to 2 parts by weight per part by weight of said catalyst of a chromium compound selected from the group consisting of oxides, halides, hydroxides, nitrates, sulfates, phosphates, organic acid salts, alkali metal chromates, alkali metal dichromates, ammonium chromates, ammonium dichromates, alkaline earth chromates and alkaline earth dichromates with 0.02 to 2 parts by weight per part by weight of said catalyst of an alkaline additive selected from the group consisting of alkali metal salts, alkaline earth salts, pyridine, pyridine salts, amines and amine salts; B is 0.02 to 2 parts by weight per part by weight of said catalyst of a mercury compound selected from the group consisting of halides, oxides, cyanates, sulfides, thiocyanates, nitrates, sulfates and organic acid salts and C is 0.02 to 2 parts by weight per part by weight of said catalyst of $I_2$.

2. A process according to claim 1 wherein said promoter is selected from group A.

3. A process according to claim 1 wherein said promoter is selected from group B.

4. A process according to claim 1 wherein said promoter is $I_2$.

References Cited

UNITED STATES PATENTS

| | | | |
|---|---|---|---|
| 2,484,487 | 10/1949 | Caldwell | 260—486 |
| 2,929,835 | 3/1960 | Hayes et al. | 260—486 |
| 3,059,024 | 10/1962 | Goldberg et al. | 260—486 |
| 3,125,592 | 3/1964 | Nevin | 260—486 XR |

FOREIGN PATENTS

| | | |
|---|---|---|
| 871,767 | 6/1961 | Great Britain. |
| 1,144,262 | 2/1963 | Germany. |

LORRAINE A. WEINBERGER, *Primary Examiner.*

A. P. HALLUIN, *Assistant Examiner.*

U.S. Cl. X.R.

203—58, 59